Figure 12:
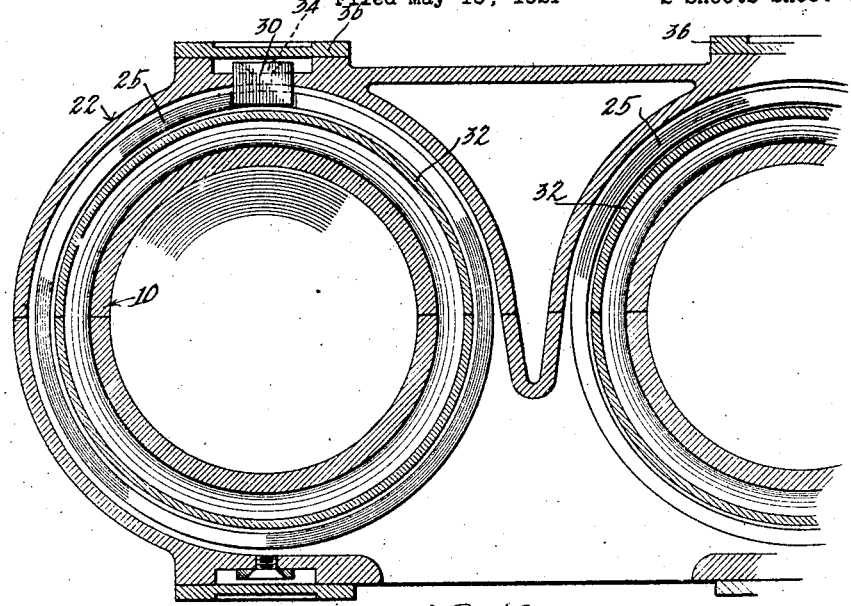

March 17, 1925.　　　　　　　　　　　　　　　　　　　1,529,836
T. B. HATCH
INTERNAL COMBUSTION ENGINE
Filed May 16, 1921　　　2 Sheets-Sheet 1
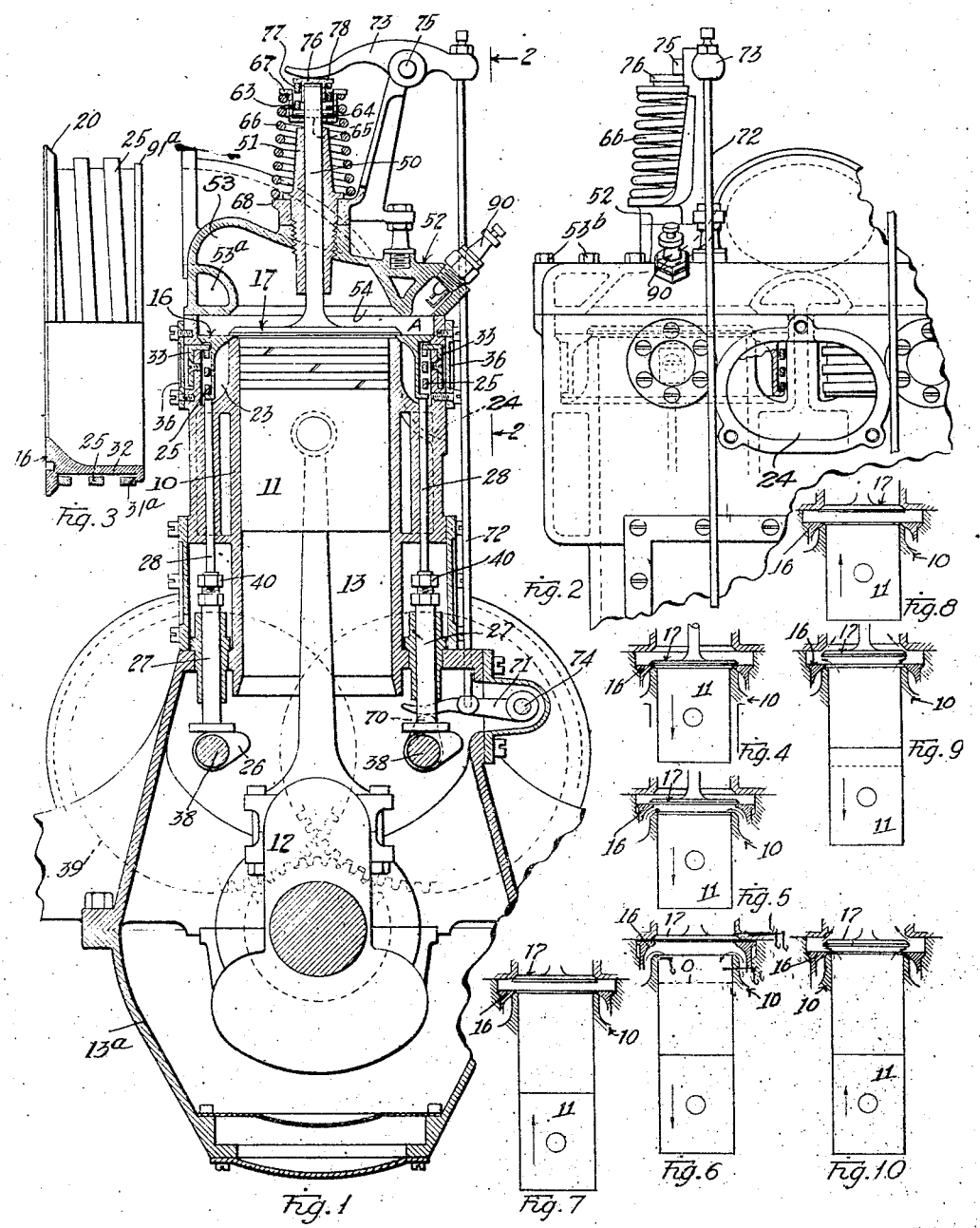

March 17, 1925.

T. B. HATCH

INTERNAL COMBUSTION ENGINE

Filed May 16, 1921　　2 Sheets-Sheet 2

1,529,836

Inventor Tracy B Hatch
By James T. Barkeler, Atty

Patented Mar. 17, 1925.

1,529,836

UNITED STATES PATENT OFFICE.

TRACY B. HATCH, OF LOS ANGELES, CALIFORNIA.

INTERNAL-COMBUSTION ENGINE.

Application filed May 16, 1921. Serial No. 469,778.

*To all whom it may concern:*

Be it known that I, TRACY B. HATCH, a citizen of the United States, residing at Los Angeles, in the county of Los Angeles, State of California, have invented new and useful Improvements in Internal-Combustion Engines, of which the following is a specification.

This invention has to do with an internal combustion engine, and it is an object of the invention to provide improved means for letting gases into and out of an engine cylinder. The invention is applicable to engines of various sizes, designs, and manners of operation, and is in no way specifically limited to the application specifically set forth in this disclosure.

For the purpose of setting forth a simple and typical form of the invention I herein disclose it as applied to, or embodied in, an engine of typical or conventional design and construction and adapted to operate on the four-cycle principle.

Internal combustion engines of ordinary design and construction a portion of the burned gases remains in the firing chamber or combustion chamber at the completion of a cycle of operation. These burned gases mix with the fresh charge of fuel admitted during the next cycle of operation, thus decreasing the power and efficiency of the engine. It is evident that the space in the combustion chamber occupied by waste or burnt gases cannot be occupied by a similar portion or amount of new charge and therefore it is impossible to get a maximum charge of combustible fuel and air and a maximum power impulse. It is also evident that the presence of waste gases contaminates the charge of fuel and air so that it has to be made sufficiently over-rich to absorb the waste gases and still be capable of being ignited and burned. These factors have a marked influence on the operation of ordinary internal combustion engines and materially reduce their power and efficiency.

Tests have shown, or indicated, that from twelve to fifteen per cent increase in efficiency can be obtained by complete scavenging of the burned gases from the combustion chamber with a corresponding increase in power developed. Numerous devices have been tested and proposed to operate in a manner to allow the gases of combustion to be completely removed from the combustion chamber and to enable a more complete and perfect charging of the combustion chamber with fuel. Such devices have, to a more or less degree, been complicated, impractical, and almost invariably unsuited for present practice, in construction and operation.

It is an object of this invention to provide a simple, effective, practical means for completely ridding the combustion chamber of an engine of burned gases, and admitting a full charge of fuel into it. In carrying out the invention a distinctive type or form of valve mechanism and gas passages has been provided as will be hereinafter pointed out in detail.

The various objects and features of the invention, including those herein particularly pointed out, will be more fully understood from the following detailed description of typical forms of the invention, throughout which reference is had to the accompanying drawings in which—

Figures 11, 13:
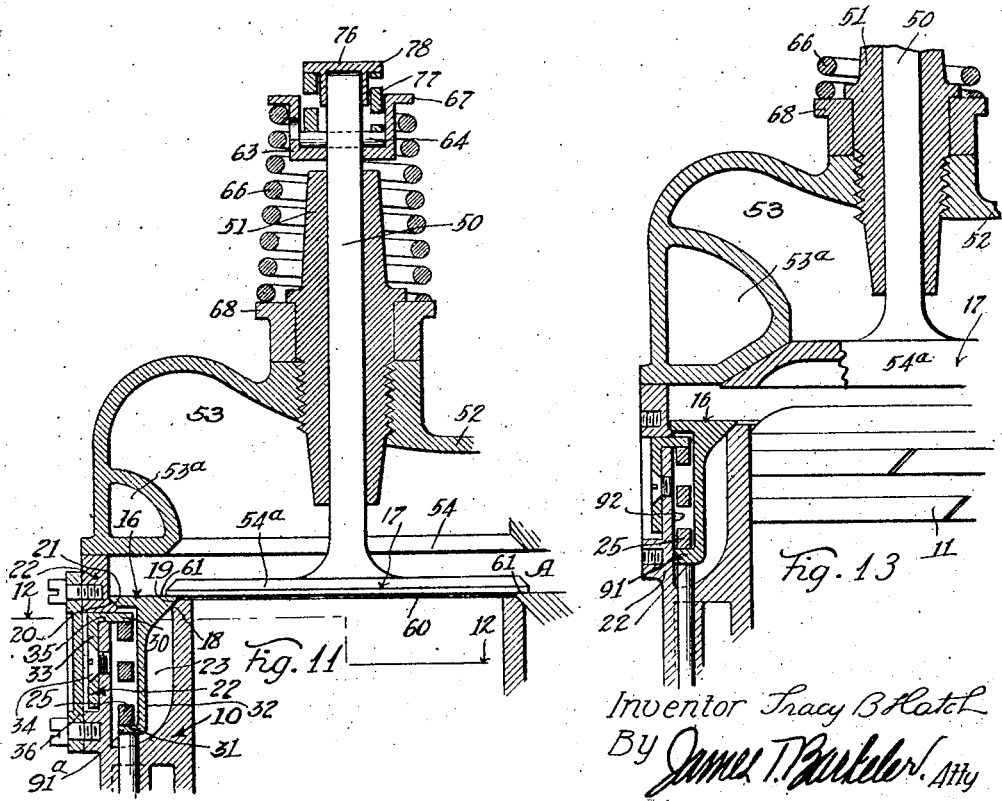

Fig. 1 is a vertical detailed sectional view of a typical four-cycle internal combustion engine embodying the present invention; Fig. 2 is a side elevation of the upper portion of the engine shown in Fig. 1, being a view taken as indicated by line 2—2 on Fig. 1; Fig. 3 is an enlarged view of the inlet valve and its spring removed from the other parts of the engine, with a portion broken away to show in cross-section; Figs. 4, 5, 6, 7, 8, 9 and 10 are diagrammatic views showing the various portions of the parts of the invention during a complete cycle of operation; Fig. 11 is an enlarged view of the upper portion of Fig. 1, showing the parts provided by the present invention more clearly and distinctly; Fig. 12 is a horizontal sectional view taken as indicated by line 12—12 on Fig. 11; and Fig. 13 is a view similar to Fig. 11, of another form of construction embodying the present invention.

In the drawings numeral 10 designates a typical engine cylinder and numeral 11 designates a typical piston adapted to work or reciprocate in the cylinder 10 in the manner common to mechanism of this character. The piston 11 is connected with a suitable crank shaft 12 by a connecting rod 13. The crank shaft 12 is supported by a suitable crank case 13ª, arranged at the lower end of the cylinder 10. The construction and arrangement herein so far described is common to ordinary engines of this character and is herein set forth merely to typify the general character of mechanism in connection with which the present invention may be employed.

In the present form the invention provides, generally, two valve members, an inlet valve 16 and an exhaust valve 17 for admitting gases into the cylinder and removing them from the cylinder. The inlet valve 16 is in the form of a ring or annular member and has a sealing surface 18 at its inner periphery adapted to engage and seat on a seat 19 provided for that purpose at the extreme upper end of the cylinder 10, and has a sealing surface 20 at its outer periphery adapted to engage and seat on a seat 21, provided for that purpose, on the casing 22 which surrounds the upper portion of the cylinder 10. The seats are preferably both concentric with the cylinder 10 and in substantially the same horizontal plane. The parts are arranged and proportioned so that the surface 18 engages the seat 19 at the same time that the surface 20 engages the seat 21. The casing 22 is preferably cylindrical in form and is arranged concentrically with the cylinder 10 so that its upper part forms the side wall of the combustion chamber A while its lower part forms the outer wall of the chamber or annular passage 23 from which the fuel or fresh gases are admitted by the valve 16 into the combustion chamber A. It will be obvious, of course, that the casing may be integral with the cylinder, as shown in the drawings or that it may be a separate member suitably attached to the cylinder. There is an inlet opening 24 in the casing 22 through which the charge is admitted or supplied into the passage 23. The inlet valve 16 in extending between the upper end of the cylinder 10 and the casing 22, and in having a surface to seat against a portion of the cylinder and a surface to seat against a portion of the casing, controls the communication between the combustion chamber and cylinder and the annular chamber 23. When the valve 16 is down, or when the surfaces 18 and 20 are in engagement with the seats 19 and 21, respectively, as shown in Figs. 1, 2, 4, 7, 8, 9, 10 and 11 communication between the combustion chamber and the passage 23 is closed or cut off and the fuel in passage 23 is not admitted or allowed to pass into the combustion chamber. However, when the valve 16 is up or is opened so that the surfaces 18 and 20 are out of engagement with the seats 19 and 20, respectively, as indicated in Figs. 5 and 6, the communication between the combustion chamber and the passage 23 is open so that fuel and air are allowed to pass freely from the passage 23 into the combustion chamber and the parts in open communication therewith. The valve 16 preferably fits more or less closely in that portion of the casing which forms the side wall of the combustion chamber so that gases will not leak past it during the operation of the engine as hereinafter described.

In the particular form of the invention shown in the drawings the valve 16 is normally held on its seats 19 and 21 by a spring 25 and is adapted to be operated or opened by suitable cams 26 through tappets 27 and push-rods 28. The spring 25 is preferably a helical spring arranged between projections 30, extending inwardly from the casing 22 and an upwardly facing shoulder 31 of a projection 91ª provided at the lower end of an annular flange 32 extending from the main portion of the valve 16. The projections 30, of which there may be any desired number, are preferably separate from the casing 22 and are formed on brackets 33, secured to the outer side of the casing 22 by suitable screws 34, to extend through openings 35 in the casing and into the chamber 23 in the manner clearly illustrated in Fig. 11. Suitable removable cover plates 36 may be provided over each of the brackets 33 as clearly illustrated in the drawings. With the arrangement and construction just described it will be readily understood how the spring 25 being arranged in a state of compression between the projections 30 and the shoulder 31 tends to move the valve 16 downwardly and thereby holds it yieldingly on its seats 19 and 21. In practice the valve 16 and spring 25 form a unitary structure as they are preferably assembled before being arranged in connection with the other parts and are removable as a unit from the other parts when the projections 30 are removed. The cams 26, which are shaped to operate the valve 16 as hereinafter explained in the operation of the engine, may be mounted on cam shafts 38 operated from the crank shaft 12 through suitable timing gears 39. The cams 26 engage and operate tappets 27 which in turn engage and operate the push rods 28. The tappets 27 may, of course, be provided with suitable take ups or adjusting devices 40. The push rods engage the projection 91ª and therefore, when moved upwardly by the cams 26 through the tappets 27, move the valve 16 upwardly and away from seats 19 and 21. With this form of mechanism provided for operating the valve 16, it is preferred that there be two or more push-rods engaging the valve 16 to lift it from its seat and that the push-rods be equally spaced around the valve so that it will be lifted evenly and will not have a tendency to tilt or get out of line.

The exhaust valve 17 is of the poppet type and has a stem 50 extending upwardly in or through a suitable guide 51 mounted in the cylinder head 52 which is provided with suitable chambers 53ᵃ to carry cooling fluid and which is secured in place by suitable bolts 53ᵇ. The cylinder head 52 has an exhaust port 53 opening downwardly into the combustion chamber A, and is formed with a valve seat 54 at the mouth of the exhaust port to receive the sealing surface 54ᵃ of the exhaust valve 17. When the exhaust valve 17 is up and the sealing surface 54ᵃ is in engagement with the seat 54, as indicated in Figs. 6, 7, 8 it completely cuts off communication between the combustion chamber and the exhaust port, and when it is down and out of engagement with the seat 54 as shown in Figs. 1, 2, 4, 5, 9, 10 and 11 it allows free communication between the combustion chamber A and exhaust port 53. The valve 17 is arranged concentrically with valve 16 and is of such diameter as to engage and co-operate with the valve 16, as illustrated in Figs. 1, 2, 4, 5, 6 and 11. There is a suitable downwardly facing sealing surface 60, at the peripheral portion of the valve 17, which is adapted to engage or seat against a suitable upwardly facing seating surface 61 at the inner peripheral portion of the valve 16. In the particular engine illustrated, the exhaust port 53 is sufficiently large that the valve 17 need not be extended or enlarged in order to be sufficiently large to properly engage and co-operate with the valve 16. The stem 50 extends above the guide 51 and has a cup 63 mounted on its upper end. The cup 63 is held against displacement from the end of the stem 50 by the pin 64 arranged in it and through a suitable opening 65 in the stem. A helical spring 66 extends between a flange 67, extending outwardly from the upper portion of the cup 53, and a shoulder 68 provided on a part solid with the head 52. The spring 66 is under compression between the flange 67 and the shoulder 68 and therefore tends to move the stem 50 upwardly and thus normally holds the valve 17 up against the seat 54.

In the particular engine herein illustrated the valve 17 is adapted to be operated, that is, moved away from its seat 54, by a suitable cam 70 through a tappet lever 71, a push rod 72, and rocker arm 73. The cam 70 is mounted on one of the cam shafts 38 and engages the outer end portion of the tappet lever 71. The tappet lever 71 is pivotally mounted at 74 and is engaged by the push rod 72 at a point intermediate its point of pivotal mounting and its outer end. The push rod 72 extends between the tappet lever 71 and the outer end of the rocker arm 73. The rocker arm 73 is pivotally mounted at 75 and is arranged so that its inner arm engages a cap 76 mounted on the upper end of the valve stem 50. The cap 76 is slidably carried on the upper end of the stem 50 and is held outwardly on the stem by a compression spring 77. The spring 77 is arranged between a flange 78 on the cap 76 and the pin 64 in the manner illustrated in Fig. 11.

The cycle of operation starts with the various parts of engine in the position shown in Figs. 1 and 11, and indicated in Fig. 4 in which position the valve 16 is seated on its seats 19 and 21, thus separating the combustion chamber A from the passage 23, while the exhaust valve 17 is seated on the inlet valve 16 so that its surface 60 engages the surface 61 of the inlet valve 16 and thus closes the upper end of the cylinder 10, the piston 11 is at the extreme upper end of its stroke and in practice there is only mechanical clearance between the valve 17 and the piston 11 so that there is practically no gas in the cylinder above the piston. As the cycle of operation starts the piston 11 moves downwardly in the cylinder away from the valve 17 and the valve 16 moves upwardly. The valve 16 is moved upwardly by the cams 26 at the same time that the cam 70 allows the valve 17 to be moved upwardly by the spring 16. In practice it is preferred that the valve 16 be moved upwardly somewhat faster than, or ahead of, the valve 17 so that the valve 17 is moved or forced upwardly by the valve 16 thereby maintaining a tight joint between the valve 16 and the valve 17. In practice the valve 17 being accurately guided by its stem 50 forms a firm true member for the valve 16 to bear against and therefore greatly aids the action of the several push rods in maintaining the valve 16 in true alignment. The spring 77 permits of the valve 17 being moved somewhat upwardly from the position in which it is held by the operating mechanism hereinbefore described. As the piston moves downwardly and the valve 16 moves upwardly away from its seat carrying with it the valve 17 new charge from the passage 23 flows or is drawn into the cylinder from all parts of the passage or from all sides by the downward movement of the piston. The positioning of the valves as the piston moves downwardly is clearly illustrated in Fig. 4. When the piston has reached the position indicated by the line O in Fig. 6 the intake valve 16 is completely open and the exhaust valve is in engagement with its seat 54 as indicated in Fig. 6. As the piston continues to move downwardly the valves remain in this last mentioned position allowing free passage of fuel and air from the passage 23 into the cylinder. It will be particularly noted that the valve 16 in leaving the seat 19 allows the charge in chamber 23 to pass into the cylinder from all sides, or from all directions thus filling the cylinder very rapidly and having an even cooling effect on the parts it engages or over which it passes. As the piston changes its direction of movement and starts upwardly the valve 16 returns to its seats 19 and 21 leaving the exhaust valve 17 in engagement with its seat 54. The valves remain in this position as the piston moves upwardly and compresses the gases or fuel which entered the cylinder during the downward movement of the piston. The positioning of the valves during the upward movement of the piston is indicated in Fig. 7. When the piston reaches the upper end of its stroke the valves are still in engagement with their seats and the charge of fuel is under compression in the combustion chamber A. The compressed charge is then ignited by a suitable spark plug 90 arranged in the cylinder head 52, as clearly illustrated in Figs. 1 and 11. The compressed gases ignited by the spark plug 90 burn or expand to drive the piston downwardly in the cylinder. As the piston reaches the bottom of its stroke the exhaust valve 17 is opened, or actuated, by the cam 70 allowing the gases of combustion in the cylinder and combustion chamber to escape from the cylinder and combustion chamber into the exhaust passage 53. After the piston has reversed its direction of movement at the lower end of its stroke and moves upwardly in the cylinder, the exhaust valve continues to open wider. During this time the burnt gases are forced or pushed out of the cylinder by the piston. At the time the piston reaches its uppermost point of travel the exhaust valve 17 reaches the inlet valve 16 so that the surfaces 60 and 61 are in engagement and there is only working clearance between the piston and valve 17 as shown in Figs. 1, 4 and 11. The engine is then in position to start another cycle of operation.

From the foregoing description and from inspection of the drawings it will be obvious how the fuel or fresh gas enters the cylinder uniformly or evenly on all sides and in all directions and how the burnt gases likewise evenly and uniformly flow out of the cylinder and combustion chamber around the edge or peripheral portion of valve 17 and are completely expelled from the cylinder and combustion chamber. As the piston moves upwardly after the impulse or power stroke the burnt gases are completely forced or pushed out of the cylinder and at the moment that they are completely expelled from the cylinder the valve 17 engages the valve 16 and completely covers or seals the cylinder. As the valve 16 moves upwardly carrying with it the valve 17, or during the admission of the charge into the cylinder, the burnt gases in the combustion chamber A are pushed or forced into the exhaust port 53. The valve 16, as before stated fits more or less accurately in that portion of the casing 22 which forms the side wall of the combustion chamber and thus prevents any appreciable amount of leakage past it as it moves upwardly to expel the burnt gases from the combustion chamber.

In Figure 13 I illustrate a form of the invention of somewhat different form and design from that just described. This form of the invention is exactly the same as the other form in operation and materially differs from the other form only in that the projection 91, at the lower end of flange 32 of the valve 16, extends somewhat further outwardly than the corresponding part in the form of the invention first described, and slidably engages the wall 92 of the casing 22. With this construction it is not important for the valve 16 to fit the portion of the casing 22 which forms the side wall of the combustion chamber A closely, as the projection 91 in engaging the wall 92 effectively seals the combustion chamber from passage 23 and prevents escaping of burnt gases from above the valves 16 and 17 into the cylinder or into the passage 23 when the valves are expelling the burnt gases from the chamber A and are admitting fresh gases into the cylinder 10. This form of the invention possesses some advantageous features of operation and construction over the form of the invention first described in that the sliding joint between the valve 16 and the casing 22 is not at or in the combustion chamber but is removed from the combustion chamber and therefore the parts forming the joints are not subject to the high temperatures that they are in the form of the invention first described.

Having described only typical forms of my invention I do not wish to limit myself to the particular details hereinabove set forth but wish to reserve to myself any changes or variations that may appear to those skilled in the art or that might fall within the scope of the following claims.

Having described a preferred form of my invention, I claim:

1. In an engine, a cylinder, an endwise facing valve seat on the cylinder, a member spaced from and surrounding the cylinder forming an annular passage surrounding the cylinder, an endwise facing valve seat on said member, and an annular valve adapted to simultaneously engage said seats to close the annular passage.

2. In an engine, a cylinder, an endwise facing valve seat on the end of the cylinder, a member spaced from and surrounding the cylinder forming an annular passage surrounding the cylinder, an endwise facing valve seat on said member, and an annular valve adapted to simultaneously engage said seats.

3. In an engine, two members one a cylinder the other a casing arranged concentrically surrounding the cylinder forming an annular passage surrounding the cylinder, a valve seat on each of said members at the passage, an annular valve adapted to simultaneously engage both of said valve seats by endwise movement, and a spring in connection with the valve and one of said members normally holding the valve on its seats.

4. In an engine, a cylinder, a valve seat at the end of the cylinder, a casing around the cylinder forming an annular passage therearound, a valve seat on said casing, a projection on the casing, an annular valve adapted to extend between the cylinder and casing and simultaneously engage the valve seats, a flange extending from the valve, the flange having a shoulder at its outer end, a spring arranged around the flange and between the projection and shoulder to normally hold the valve on its seats.

5. In an engine, a cylinder, a member forming a combustion chamber in connection with the cylinder, said member having an annular inlet opening in it and a round exhaust opening in it, an annular valve adapted to control the inlet opening, a disk valve adapted to control the exhaust opening, means for opening the disk valve and moving it into engagement with the annular valve to close the opening in it, and means for opening the annular valve and moving the disk valve closed.

6. In an engine embodying a cylinder with a combustion chamber having an annular inlet opening and a round exhaust opening, an annular valve for controlling the inlet opening, a disk valve for controlling the exhaust opening, means for moving the disk valve to engage the annular valve to close the opening in it, means for moving the annular valve, and means for holding the disk valve in engagement with the annular valve during movement of the annular valve.

7. In an engine embodying a cylinder with a combustion chamber having an annular inlet opening and a round exhaust opening, an annular valve for controlling the inlet opening, a disk valve for controlling the exhaust opening, means for moving the disk valve to engage the annular valve to close the opening in it, means for moving the annular valve, and yielding means for holding the disk valve in engagement with the annular valve during movement of the annular valve.

8. In an engine, a cylinder with a combustion chamber in connection with it, a piston reciprocating in the cylinder, a valve adapted to control a port in the combustion chamber, and means for moving the valve so that it closes an end of the cylinder at the time the piston reaches that end of the cylinder.

9. In an engine, a cylinder with a combustion chamber in connection with it the chamber having an annular inlet opening concentric with the cylinder and an outlet opening in it, the inlet opening being at the end of the cylinder, an annular valve for controlling the inlet opening, a disk valve for controlling the outlet opening, and means for moving the disk valve so that it engages the annular valve and closes the end of the cylinder upon the piston reaching that end of the cylinder.

10. In an engine, a cylinder with a combustion chamber in connection with it the chamber having an annular inlet opening concentric with the cylinder and an outlet opening in it, the inlet opening being at the end of the cylinder, an annular valve for controlling the inlet opening, a disk valve for controlling the outlet opening, means for moving the disk valve so that it engages the annular valve and closes the end of the cylinder upon the piston reaching that end of the cylinder, and means for moving the inlet valve to move the disk valve from the end of the cylinder.

11. In an engine, a cylinder and cylinder head with a passage leading out through the cylinder head and having a downwardly facing valve seat, and an annular passage leading into the cylinder and having an upwardly facing valve seat, two valves adapted to control said passages and seating upwardly and downwardly, respectively, to close their passages, said valves being also formed to seat one on the other, and means to move the two valves independently and to move them together when seated one on the other.

12. In an engine, a cylinder with exhaust and inlet passages with valve seats around them, the two valve seats facing in opposite directions and spaced apart, two valves adapted respectively to seat on the two seats and being spaced apart when so seated, the two valves being formed also so that one may be seated on the other, and means to move the valves to and from their seats and to move them together across the space separating their seats.

13. In an engine, a cylinder with a combustion chamber and with inlet and exhaust passages communicating with the chamber at opposite sides of it and having valve seats for the two passages facing in opposite directions, two valves adapted, respectively, to seat on the two seats and each to move across the combustion chamber and formed so that one of the valves may seat on the other, and means to move the valves independently and to move them together, when seated one on the other, across the combustion chamber.

14. In an engine, a cylinder with a combustion chamber and with inlet and exhaust passages communicating with the chamber at opposite sides of it and having valve seats for the two passages facing in opposite directions, two valves adapted, respectively, to seat on the two seats and each to move across the combustion chamber and formed so that one of the valves may seat on the other, a piston in the cylinder, and means to move the valves in co-operation with the piston movements so that both valves are seated on their passage closing seats during the explosion stroke of the piston, the exhaust valve is moved from its seat and crosses the combustion chamber during the exhaust stroke and seated on the intake valve near the end of the exhaust stroke, both valves are moved back together across the combustion chamber during the intake stroke, and the intake valve is then moved back across the chamber to seat on its passage closing seat near the end of the intake stroke.

15. In an engine, a cylinder with a combustion chamber under the cylinder head, the cylinder head having an exhaust passage and a downwardly facing valve seat, the cylinder having an annular intake passage around its upper end leading to the combustion chamber and having an annular valve seat facing upwardly, a disk exhaust valve seating upwardly on the exhaust valve seat, an annular inlet valve seating downwardly on the inlet valve seat, the two valve seats and the two valves when seated thereon being spaced apart across the combustion chamber, and the exhaust valve also being adapted to seat downwardly on the inlet valve, and means to move the valves independently and to move them together, when seated one on the other, across the combustion chamber.

16. In an engine, a cylinder with an annular port surrounding it and leading upwardly into it, the port having an upwardly facing valve seat at each of its opposite annular edges, and an annular valve adapted to seat downwardly on said valve seats to close the ports; the cylinder head having another port, with a downwardly facing valve seat above the first mentioned port, and a valve adapted to seat upwardly on said seat.

17. In an engine, a cylinder with an enlarged circular combustion chamber at its upper end next its head, an annular port surrounding the cylinder and leading up into the outer part of the combustion chamber, and there being an upwardly facing valve seat around the annular port at the combustion chamber, another port leading down through the head and having a downwardly facing seat, an upwardly seating valve and a downwardly seating annular valve, and the two valves being so formed that one may seat on the other.

18. In an engine, a cylinder with an enlarged circular combustion chamber at its upper end next its head, an annular port surrounding the cylinder and leading up into the outer part of the combustion chamber, and there being an upwardly facing valve seat around each edge of the annular port at the lower part of the combustion chamber, an annular valve seating on the two seats and adapted to be moved upwardly across the combustion chamber, the cylinder head having another port leading down into the chamber and having a downwardly facing valve seat, a valve seating upwardly on said seat and adapted to be moved down across the chamber, and the two valves being so formed that one may be seated on the other.

19. In an engine, a cylinder with a combustion chamber at one end, a piston in the cylinder, the walls of the combustion chamber opposite the end of the cylinder having a port, a valve to close that port, and means to move the valve across the chamber to open the port and to close the end of the cylinder as the piston reaches that end of the cylinder.

20. In an engine embodying a cylinder and a combustion chamber, two valves, one adapted to control the admission of fresh gases to the cylinder and combustion chamber, the other adapted to control the escape of gases from the combustion chamber, the two valves together being adapted to entirely fill the cross-section of the combustion chamber, and means to move the valves across the chamber to remove burned gases from it.

In witness that I claim the foregoing I have hereunto subscribed my name this 4th day of May, 1921.

TRACY B. HATCH.

Witness:
VIRGINIA BERINGER.